(12) United States Patent
Moon et al.

(10) Patent No.: US 7,480,524 B2
(45) Date of Patent: Jan. 20, 2009

(54) PORTABLE COMMUNICATION TERMINAL IN SLANT POSITIONS FOR DISPLAYING INFORMATION

(75) Inventors: Ji-Hyun Moon, Daegu (KR); Beom-Ku Han, Seoul (KR); Jong-Seong Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 678 days.

(21) Appl. No.: 10/974,290

(22) Filed: Oct. 27, 2004

(65) Prior Publication Data

US 2005/0227737 A1 Oct. 13, 2005

(30) Foreign Application Priority Data

Apr. 7, 2004 (KR) ...................... 10-2004-0023836

(51) Int. Cl.
*H04M 1/00* (2006.01)
(52) U.S. Cl. ................. 455/575.4; 455/556.2; 455/566; 455/575.1; 345/156; 361/681
(58) Field of Classification Search ............. 455/575.4, 455/550.1, 556.2, 566, 575.1, 575.3; 345/156, 345/214; 361/681, 683
See application file for complete search history.

(56) References Cited

U.S. PATENT DOCUMENTS 5,682,182 A * 10/1997 Tsubosaka .................. 345/173
6,275,376 B1 * 8/2001 Moon ......................... 361/683
6,751,487 B1 * 6/2004 Rydbeck et al. ........... 455/575.3
6,903,927 B2 * 6/2005 Anlauff ....................... 361/681
7,069,043 B2 * 6/2006 Sawamura et al. ........ 455/550.1
7,174,195 B2 * 2/2007 Nagamine ................. 455/575.1
7,245,949 B2 * 7/2007 Kim et al. ................. 455/575.4
2005/0124396 A1 * 6/2005 Brems et al. .............. 455/575.4

FOREIGN PATENT DOCUMENTS

CN 1179050 4/1998
CN 1369997 9/2002

* cited by examiner

Primary Examiner—Matthew D. Anderson
Assistant Examiner—Shaima Q Aminzay
(74) Attorney, Agent, or Firm—The Farrell Law Firm, PC

(57) ABSTRACT

Disclosed herein is a portable communication terminal for displaying information that is suitable for use as a personal digital album, and that includes a cover having a planar surface; a display device adapted to open/close via a sliding linear movement along a direction away from the cover, and a rotational movement toward the cover; a number of openings formed on the cover for providing the sliding and rotational movements of the display device and for exposing the information displayed on the display device; and at least one support arm placed on the lateral surface of the cover for supporting the sliding and rotational movements of the display device.

11 Claims, 16 Drawing Sheets

PORTABLE COMMUNICATION TERMINAL IN SLANT POSITIONS FOR DISPLAYING INFORMATION

PRIORITY

This application claims priority to an application entitled "Portable Communication Terminal For Displaying Information" filed with the Korean Intellectual Property Office on Apr. 7, 2004 and assigned Serial No. 2004-23836, the contents of which are incorporated herein by reference.

BACKGROUND OF THE INVENTION

1. Field of the Invention

The present invention relates to portable terminals, including cellular phones, PDAs (personal digital assistants), HHPs (hand held phones), and PCS (personal communication service) phones, and more particularly to a portable terminal for displaying information capable of displaying a digital album using a wireless communication method.

2. Description of the Related Art

In general, a "portable communication apparatus" refers to an electronic apparatus which a user can carry with him to perform wireless communication with a desired partner. In consideration of portability, designs of such portable communication apparatuses tend not only to be compact, slim, and light, but also to provide multimedia and a wide variety of other functions. In particular, it is expected that future portable communication apparatuses will incorporate greater multi-functionality and multi-purpose utilization, and be more compact and lighter. Future portable communication apparatuses are further expected to be configured to allow for modification, to be suitable for various multimedia environments or Internet environments. Presently available portable communication apparatuses are commonly used by all kinds of people, including men and women, young and old alike, throughout the world, and are recognized by some people as being nearly indispensable and are always carried by such people.

Conventional portable communication apparatuses may be classified into various types according to their appearance, such as bar-type portable communication apparatuses, flip-type portable communication apparatuses, and folder-type portable communication apparatuses. The bar-type portable communication apparatus has a single housing shaped like a bar. The flip-type portable communication apparatus has a flip, which is pivotably mounted to a bar-shaped housing by a hinge device. The folder-type portable communication apparatus has a folder coupled to a single bar-shaped housing by a hinge device in such a manner that the folder can be rotated to fold/unfold to/from the housing.

Further, portable communication apparatuses may be classified into a neck wearable type and a wrist wearable type according to the position at or the way in which a user wears the communication apparatus. The neck wearable type communication apparatus is one which is worn around a user's neck, typically using a string, while the wrist wearable type communication apparatus is one which is worn around the wrist.

Additionally, portable communication apparatuses may be classified into rotation-type communication apparatuses and sliding-type communication apparatuses according to the manner of opening/closing the communication apparatus. In the rotation-type portable communication apparatus, two housings are coupled to each other in a manner that allows one housing to rotate to open or close relative to the other housing while facing each other. In the sliding-type portable communication apparatus, two housings are coupled to each other in a manner that allows one housing to slide along a longitudinal direction to open or close relative to each other. These variously classified portable communication apparatuses are readily understood by those of skill in the art.

Meanwhile, conventional portable communication apparatuses now typically also function to transmit data at a high speed, in addition to the basic function of performing voice communication. In other words, according to the increasing consumer demand, portable communication apparatuses now typically provide a wireless communication technology capable of transmitting data at a high speed.

Conventional portable communication apparatuses may also be equipped with a camera lens which enables each communication apparatus to obtain and transmit an image. That is, current conventional portable communication apparatuses may have an external or imbedded camera lens module which enables a user to communicate photographed images with a desired partner or to take a photograph of a desired subject.

However, conventional portable communication apparatuses do not provide a positioning means that protects the screen of the apparatus, which displays information provided from separate external environment, nor do conventional portable communication devices make it convenient to watch the screen. Further, it is not possible to watch the displayed data in a convenient manner or, in particular, to position the communication apparatus as desired in order to watch the data conveniently.

SUMMARY OF THE INVENTION

Accordingly, the present invention has been made to solve the above-mentioned problems of conventional apparatuses, and an object of the present invention is to provide an information display terminal which can be carried, stored, folded, and positioned in a convenient manner.

Another object of the present invention is to provide an information display terminal which can be conveniently used as a digital album in a manner.

Another object of the present invention is to provide an information display terminal having a display device adapted to open/close in a sliding manner.

Another object of the present invention is to provide an information display terminal which can be selectively positioned with a slant in either a transverse or longitudinal direction.

Another object of the present invention is to provide an information display terminal which can adjust the degree of slant.

In order to accomplish this object, there is provided a portable communication terminal for displaying information including a cover having a planar surface; a display device adapted to open/close via a sliding linear movement along a direction while facing the cover, a movement away from the cover after the sliding liner movement, and a rotational movement toward the cover; a number of openings formed on the cover for providing the sliding and rotational movements of the display device and for exposing the information displayed on the display device; and at least one support arm placed on the lateral surface of the cover for supporting the sliding and rotational movements of the display device.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description of the present invention, a detailed description of known functions and configurations incorporated herein is omitted to avoid making the subject matter of the present invention unclear.

Figure 1:
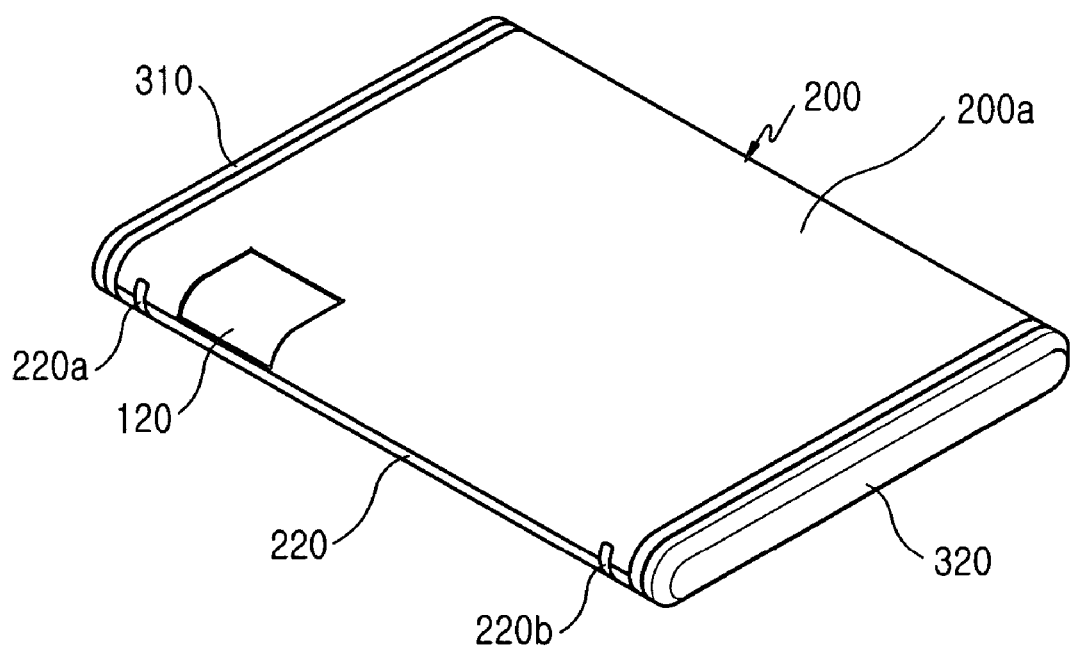
FIG. 1 is a perspective view showing the upper surface of a portable communication terminal for displaying information according to a first preferred embodiment of the present invention.
Figure 2:
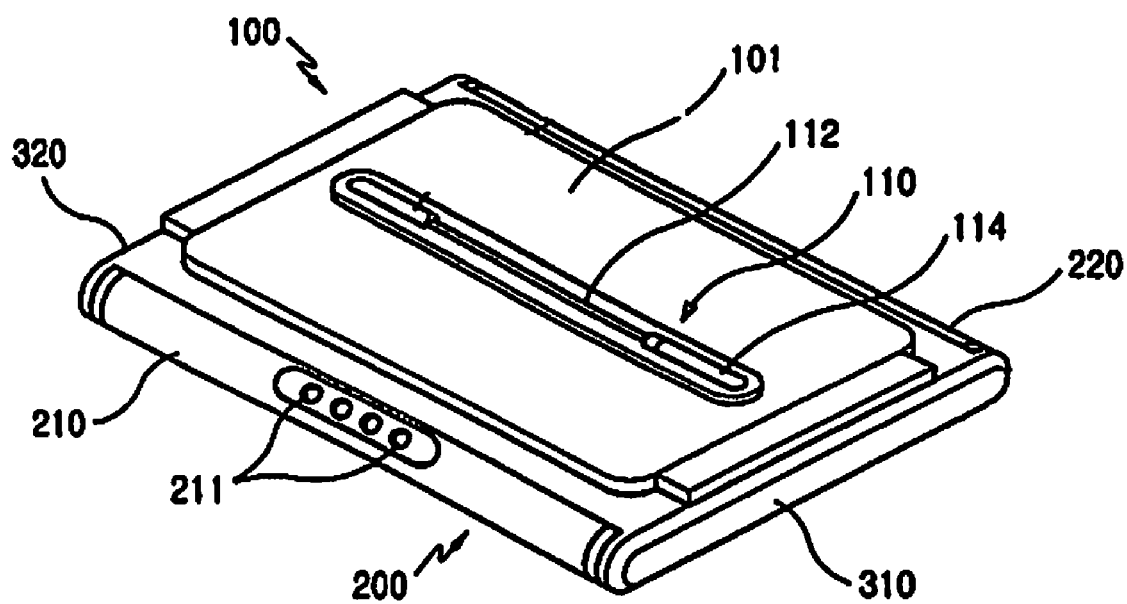
FIG. 2 is a perspective view showing the lower surface of the portable communication terminal for displaying information according to the first preferred embodiment of the present invention.
Figure 3:
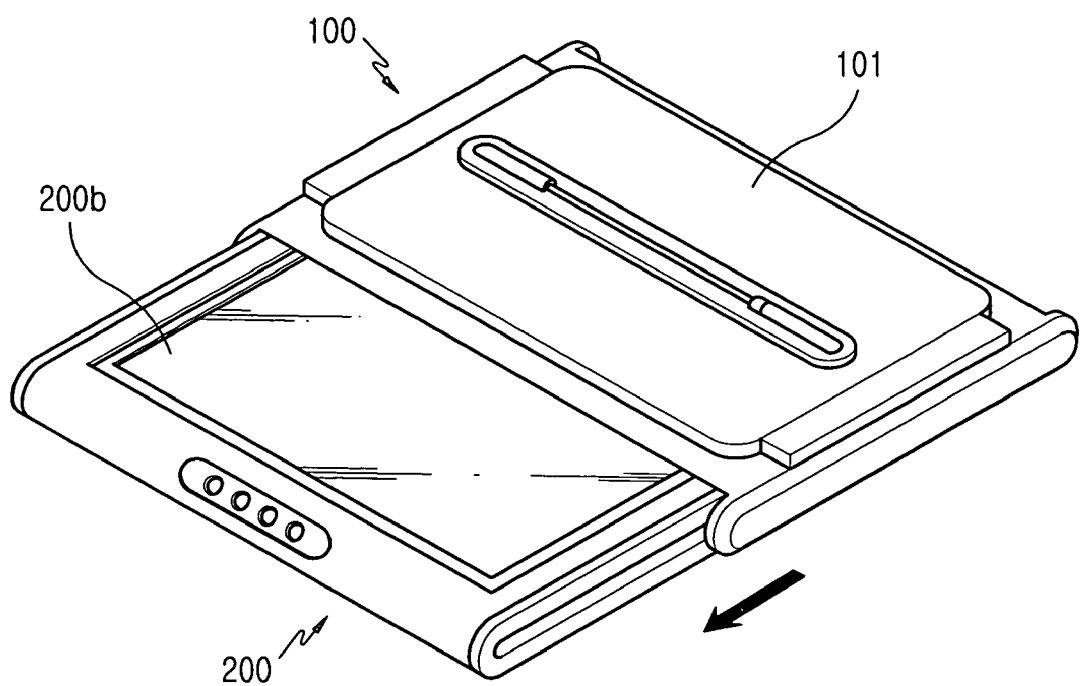
FIG. 3 is a perspective view the portable communication terminal for displaying information according to the first preferred embodiment of the present invention, wherein a sliding rotation display of the device is partially slid open.

As shown in FIGS. 1 to 3, a portable communication terminal for displaying information according to the present invention is suitable for use as a digital album for displaying personal information and can be positioned with a slant relative to either a transverse or longitudinal direction. The apparatus has a display device which makes it possible to watch displayed data in a convenient manner when the display device is completely slid open and rotated 180° for use, and which is protected by a cover when not in use.

A portable communication terminal for display information according to the present invention includes a cover 100 having a planar surface 102 (shown in FIG. 7); a display device 200 adapted to open/close via a sliding linear movement in a transverse direction or a longitudinal direction relative to the cover 100, and through a rotational movement away from the cover 100 relative to the display device 200.

Figure 4A:
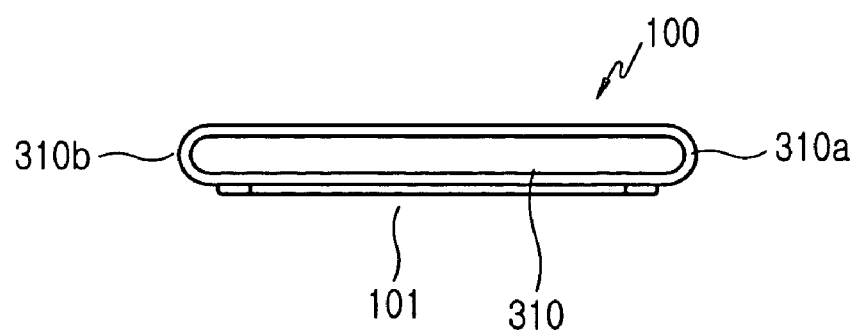
FIGS. 4a to 4d are side views showing the opening/closing procedure of the portable communication terminal for displaying information according to the first preferred embodiment of the present invention.
Figure 4B:
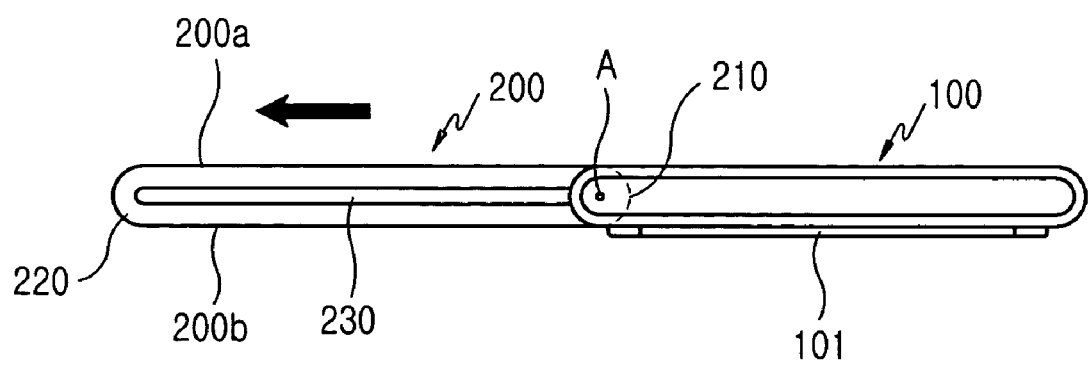

A number of openings 332, 334, and 336 (shown in FIG. 8) are formed on the cover 100 to facilitate the sliding and rotational movements of the display device 200 and to expose, to allow viewing of, information displayed on the display device 200. At least one support arm 310 and 320 is provided on a lateral surface of the cover to support the sliding and rotational movements of the display device 200. The sliding linear movement, as used herein, refers to a movement wherein an end of the display device 200 completely moves from one end to the other end of the cover 100, as shown in FIGS. 4a and 4b.

Figure 5:
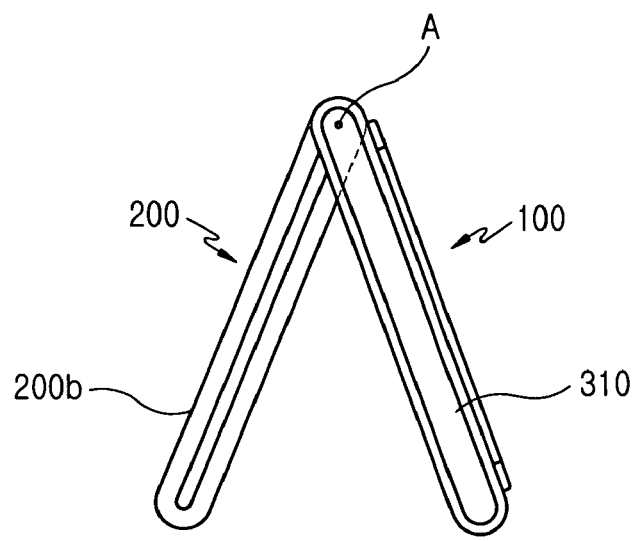
FIGS. 5 and 6 show exemplary positioning status of the portable communication terminal for displaying information according to a first preferred embodiment of the present invention.

The support arms 310 and 320 are integrally formed on the cover 100. The display device 200 has a linear sliding groove 230 (shown in FIG. 4b) formed on its lateral surface for linear sliding. The cover 100 and the support arms 310 and 320 are preferably formed of a metallic material. The display device 200 has friction pads 220a and 220b (FIG. 1) placed on an end 220 thereof. The friction pads 220a and 220b are preferably symmetrically positioned and face each other and are used to position the portable communication apparatus according to the present invention using the cover 100. FIG. 5 shows the positioning status using the friction pads 220a and 220b. The friction pads 220a and 220b are disclosed in FIG. 1. Both ends of the display device 200 are preferably of a semi-cylindrical shape and both ends of the support arms 310 and 320 are preferably of a semi-circular shape, to allow smooth rotation of the display device 200.

Figure 4C:
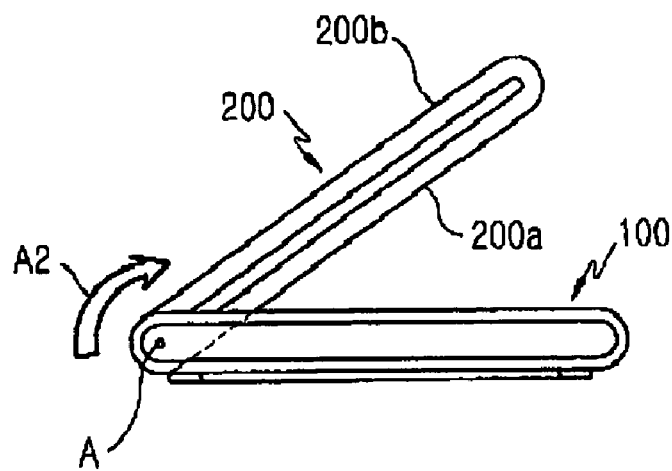
Figure 4D:
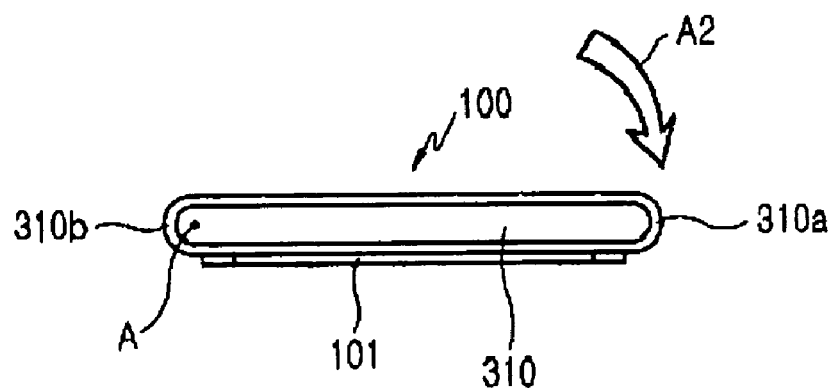

The opening/closing procedure of the portable communication terminal according to the present invention will now be described with reference to FIGS. 4a to 4d. FIGS. 4a and 4b are side views that correspond to FIGS. 1 and 3, respectively. The display device 200 initially performs a complete linear sliding movement along a transverse direction indicated by an arrow (shown in FIG. 4b) from a closed state shown in FIG. 4a, the display device 200 is moved into an intermediate state, as shown in FIG. 4b. Specifically, the display device 200 is linearly slid from the cover 100 in the transverse direction. After the complete sliding movement, the display device 200 is rotated about a hinge axis A in a direction as indicated by arrow A2, as shown in FIG. 4c. When the display device rotated, i.e. rotated 180°, as shown in FIG. 4d, or to a predetermined rotation angle, the display device 200 is completely received in the cover 100. A user can now watch information displayed on the display device 200, from a front direction. The information is displayed on the lower surface 200b of the display device 200, and the upper surface 200a thereof is a planar surface. Accordingly, the lower surface 200b of the display device 200 is protected by the cover in the closed state shown in FIG. 4a and is completely exposed to the user in the open state shown in FIG. 4d.

Figure 6:
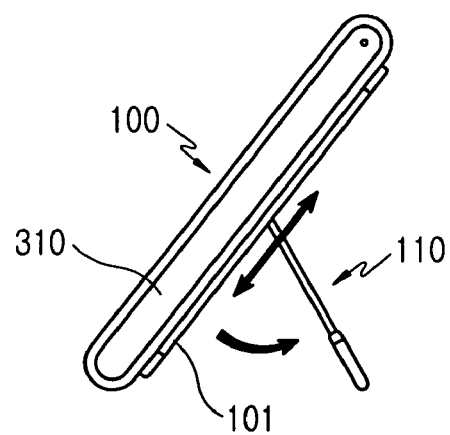

The display device 200 can be variably positioned to allow a user to watch it in a convenient manner, in particular, it can be slanted as shown in FIGS. 5 and 6. In order to slant the display device 200, the user may use the cover 100 as shown in FIG. 5 or a positioning means 110, which is placed on the rear surface 101 of the cover 100, as shown in FIG. 6. FIG. 6 shows that a positioning rod 112 of the positioning means can be moved in two directions, as indicated by two solid arrows shown in FIG. 6.

Figure 7:
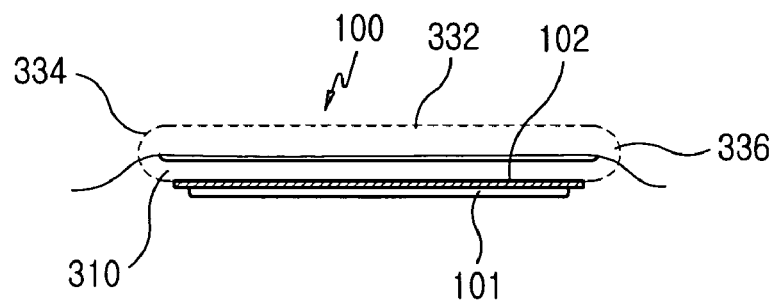
FIG. 7 is a side view taken along line X-X' of FIG. 8 showing a positioning cover according to the first preferred embodiment of the present invention.
Figure 8:
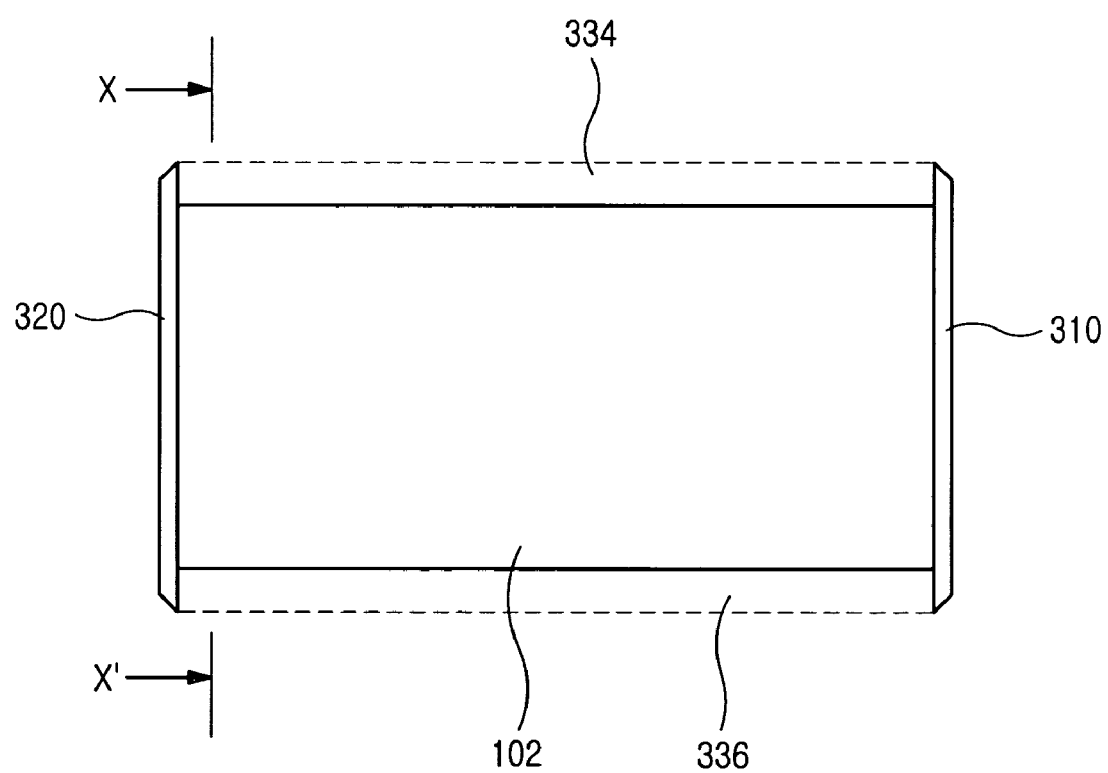
FIG. 8 is a partially-broken view of the positioning cover according to the first preferred embodiment of the present invention.
Figure 9:
FIG. 9 is a front view showing a positioning rod according to the first preferred embodiment of the present invention.
Figure 10A:
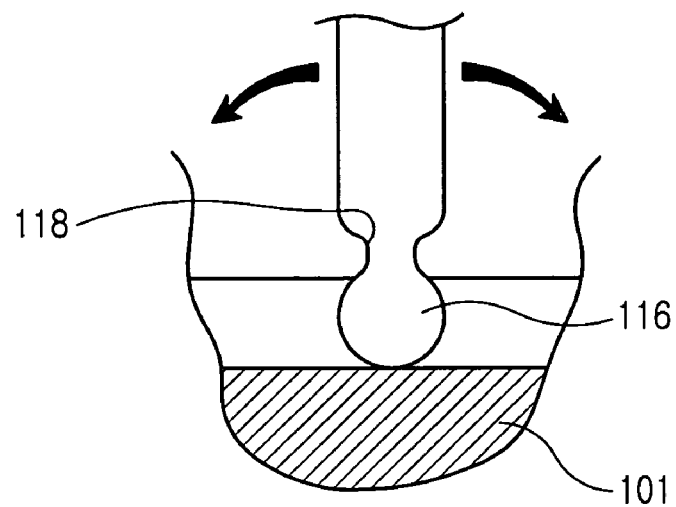
FIGS. 10a and 10b are sectional views showing the mounting status of a sliding spherical portion placed on an end of the positioning rod shown in FIG. 9.
Figure 10B:
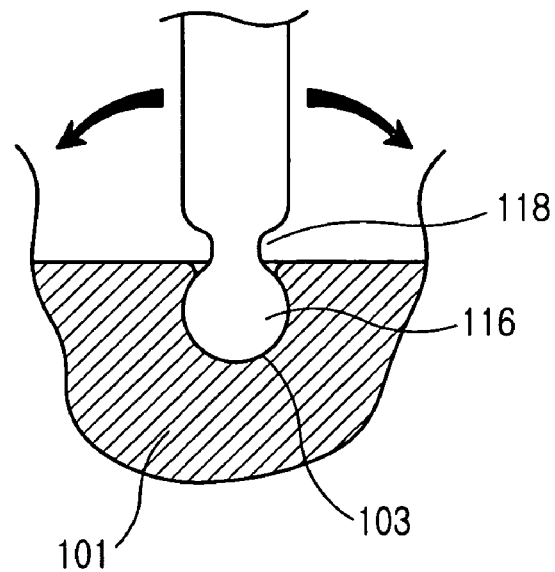

As shown in FIGS. 7 and 8, the openings 332, 334, and 336 are formed on the cover 100 to facilitate the sliding and rotational movements of the display device 200 and to allow the user to watch the information displayed on the display device 200. The openings include a first opening 332 formed on the cover 100 to expose the displayed information after the sliding and rotational movements of the display device 200, a second opening 334 formed on an end of the cover 100, and a third opening 336 formed on the other end of the cover 100. The second opening 334 is placed next to a side of the first opening 332, and the third opening 336 next to the other side thereof. Accordingly, the first, second, and third openings 332, 334, and 336 are arranged in series.

As shown in FIGS. 2 and 9 to 10b, the portable communication terminal according to the present invention is provided with a positioning means 110 for selectively positioning at a slant in the transverse or longitudinal direction. The positioning means 110 is placed on the bottom surface 101 of the cover. The positioning means 110 is composed of a receiving groove 103 extending linearly along the longitudinal direction of the bottom surface 101 and a positioning rod 112 having an end 116 inserted into the receiving groove 103 so that it can slide along the receiving groove 103. The positioning rod 112 is adapted to be rotate vertically and horizontally while the end 116 is received in the receiving groove 103. The end 116 of the positioning rod 112 is preferably configured as a spherical portion, and an outer peripheral groove 118 is formed adjacent to the spherical portion 116. The other end of the positioning rod 112 is preferably provided with an elastic body 114 of rubber material. The elastic body 114 enables the display device 200 to be positioned with a slant by preventing the positioning rod 112, which is slanted relative to the cover 100, from slipping along a surface upon which the positioning means 110 and portable communication terminal are placed.

The spherical portion 116 of the positioning rod 112 can slide along the extension direction of the receiving groove 103. Although the spherical portion 116 is tightly inserted into the receiving groove 103, a user can move the spherical portion along the receiving groove 103. Of course, the spherical portion is retained in such a manner that it remains stationary when not being moved by the user.

Figure 11:
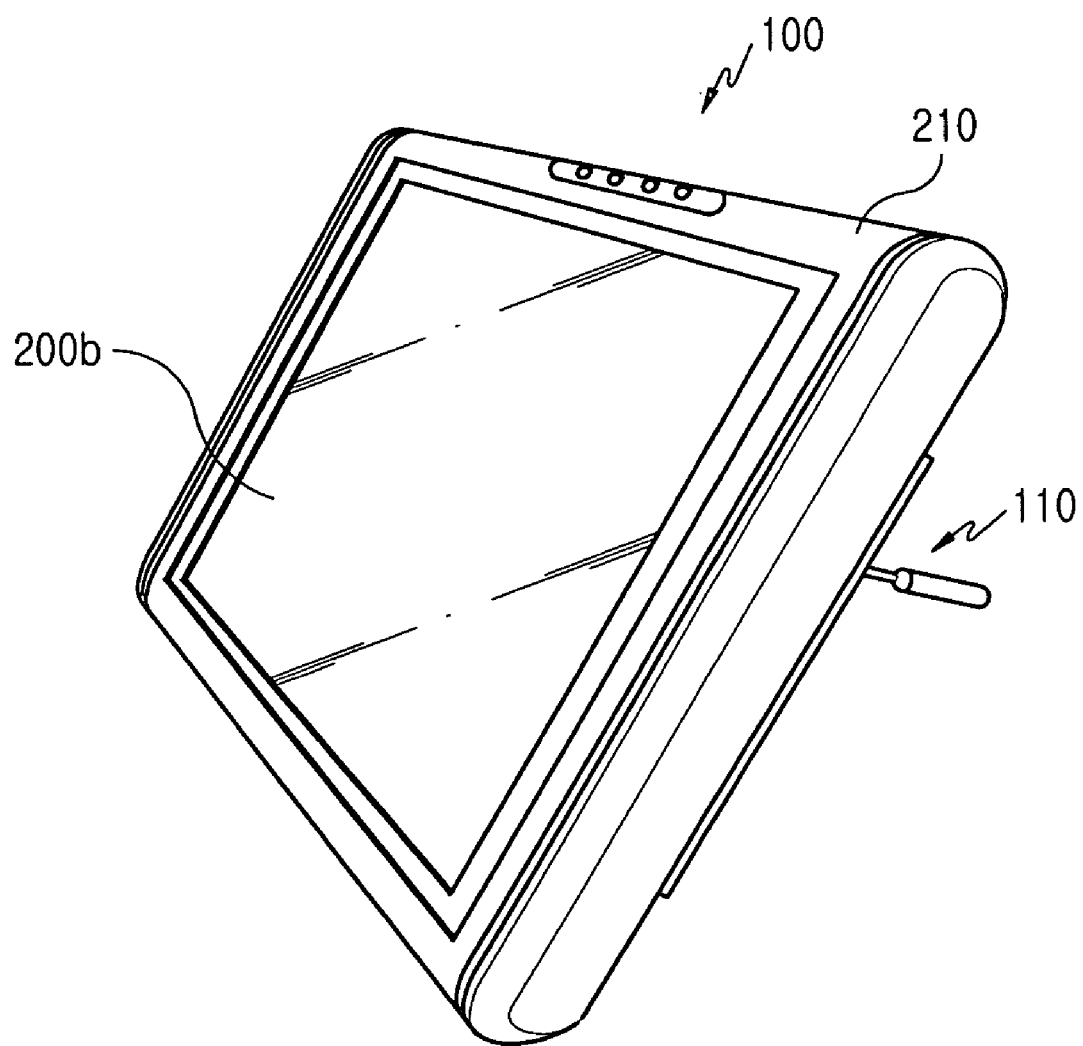
FIGS. 11 and 12 show the portable communication terminal in slanted positions according to the first preferred embodiment of the present invention.
Figure 12:
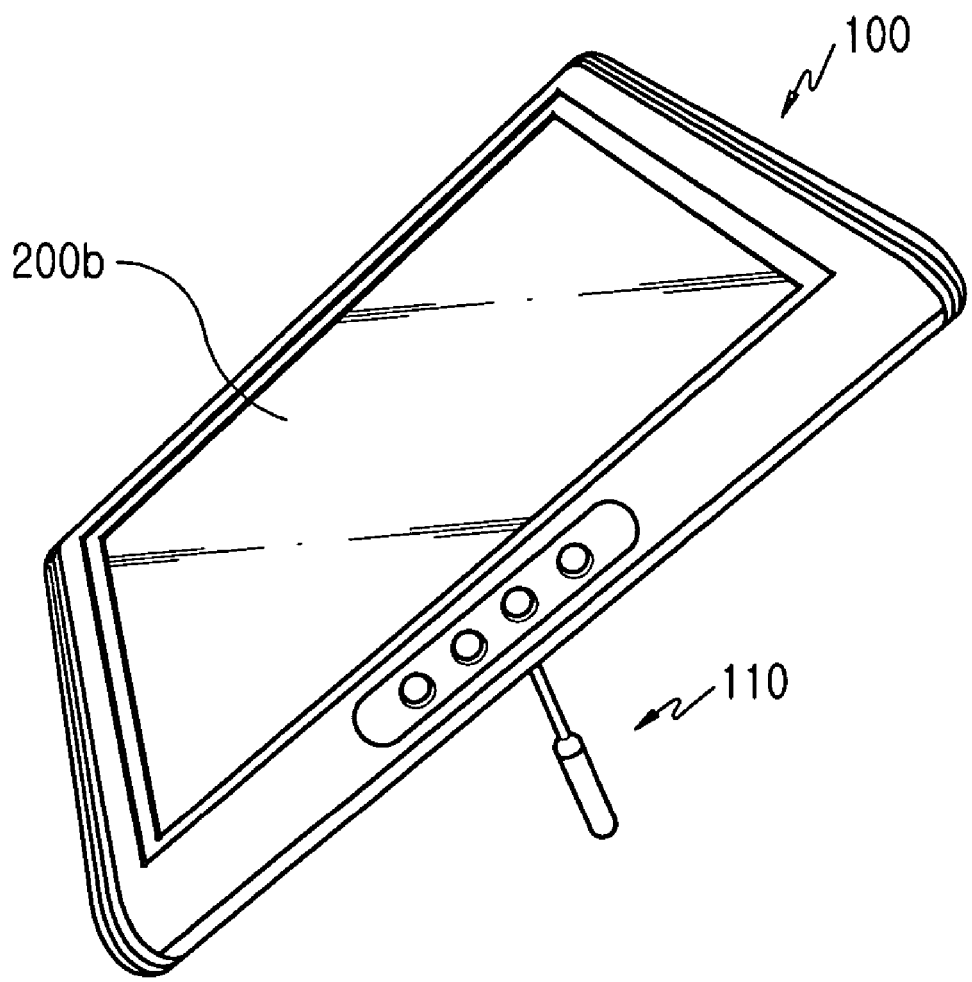
Figure 13:
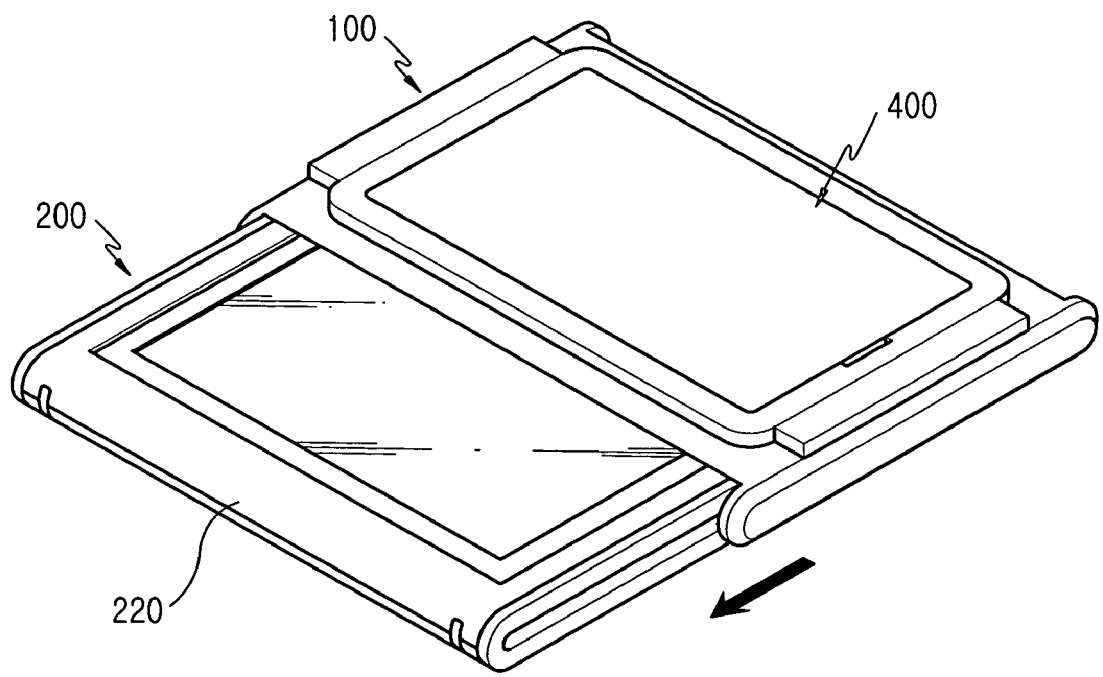
FIG. 13 is a perspective view showing a portable communication terminal according to a second preferred embodiment of the present invention.
Figure 14A:
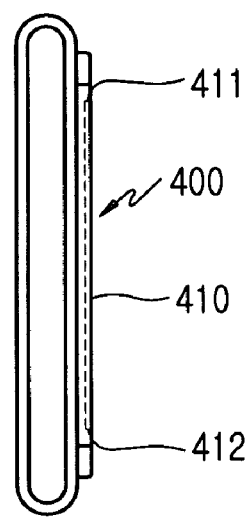
FIGS. 14a to 14c are side views showing the positioning procedure of the portable communication terminal according to the second preferred embodiment of the present invention.
Figure 14B:
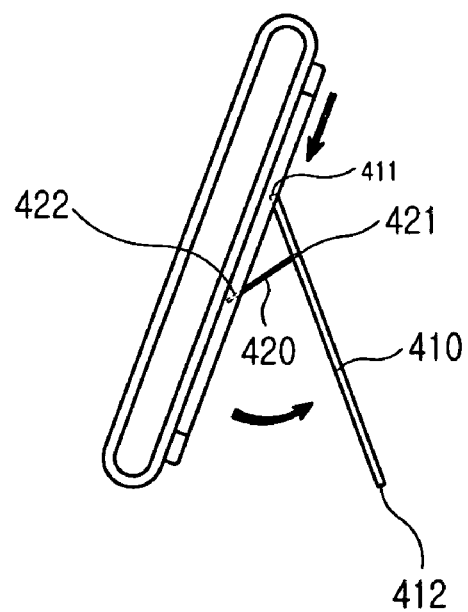
Figure 14C:
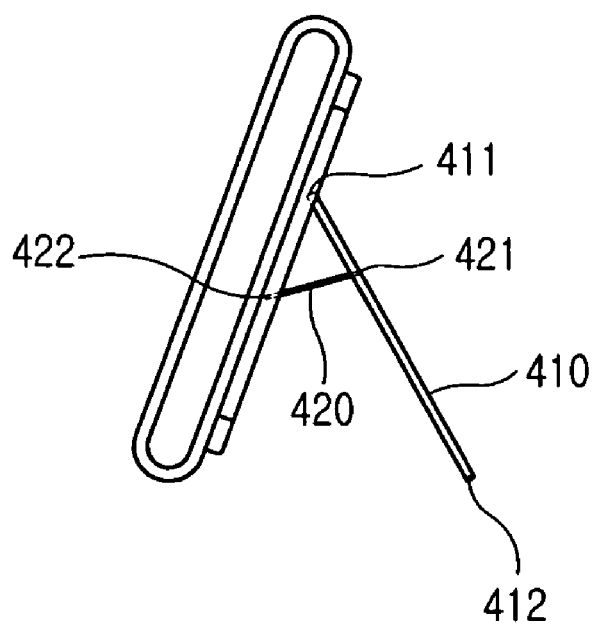
Figure 15:
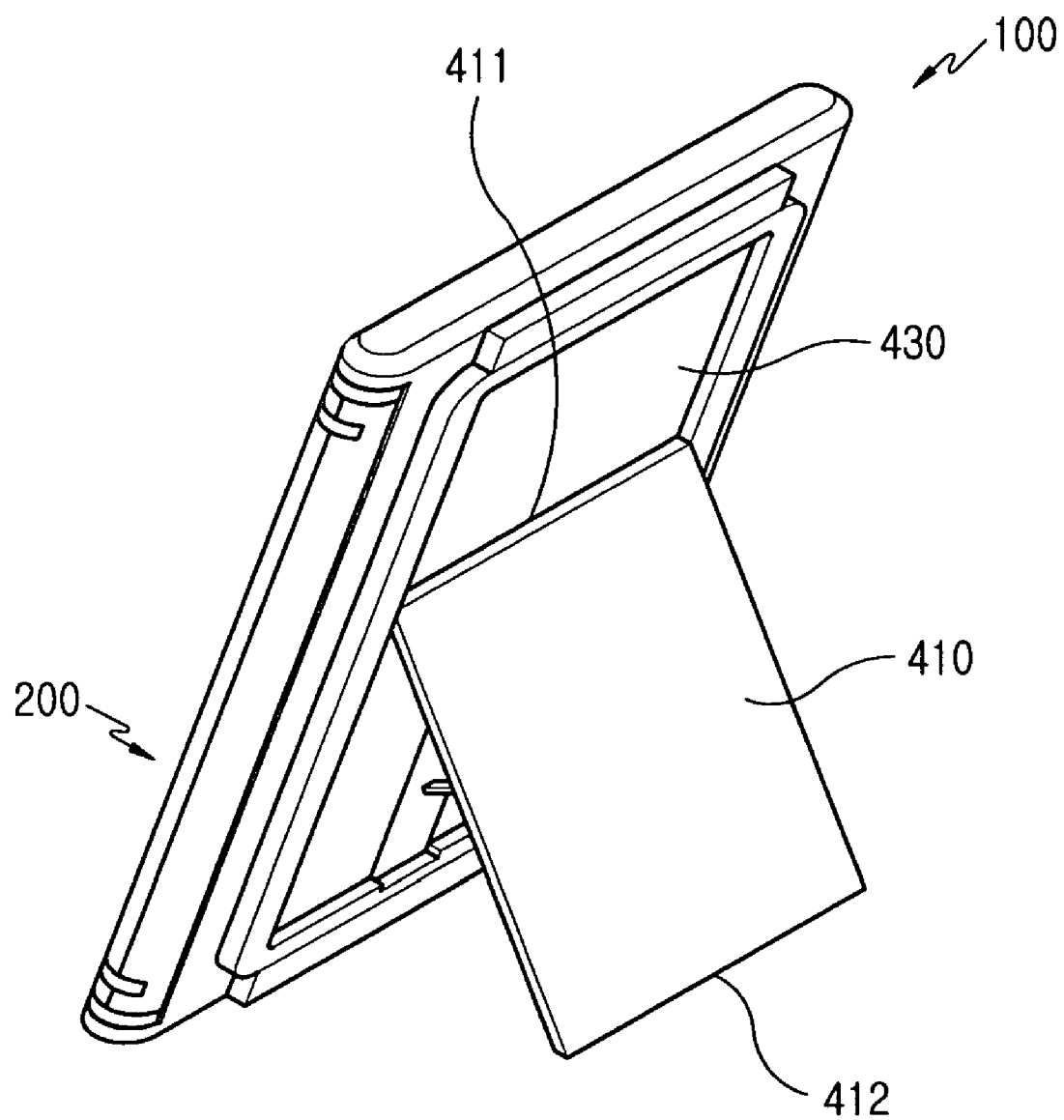
FIGS. 15 and 16 are perspective views showing the slanted positioning status of a portable communication terminal according to the second preferred embodiment of the present invention.
Figure 16:
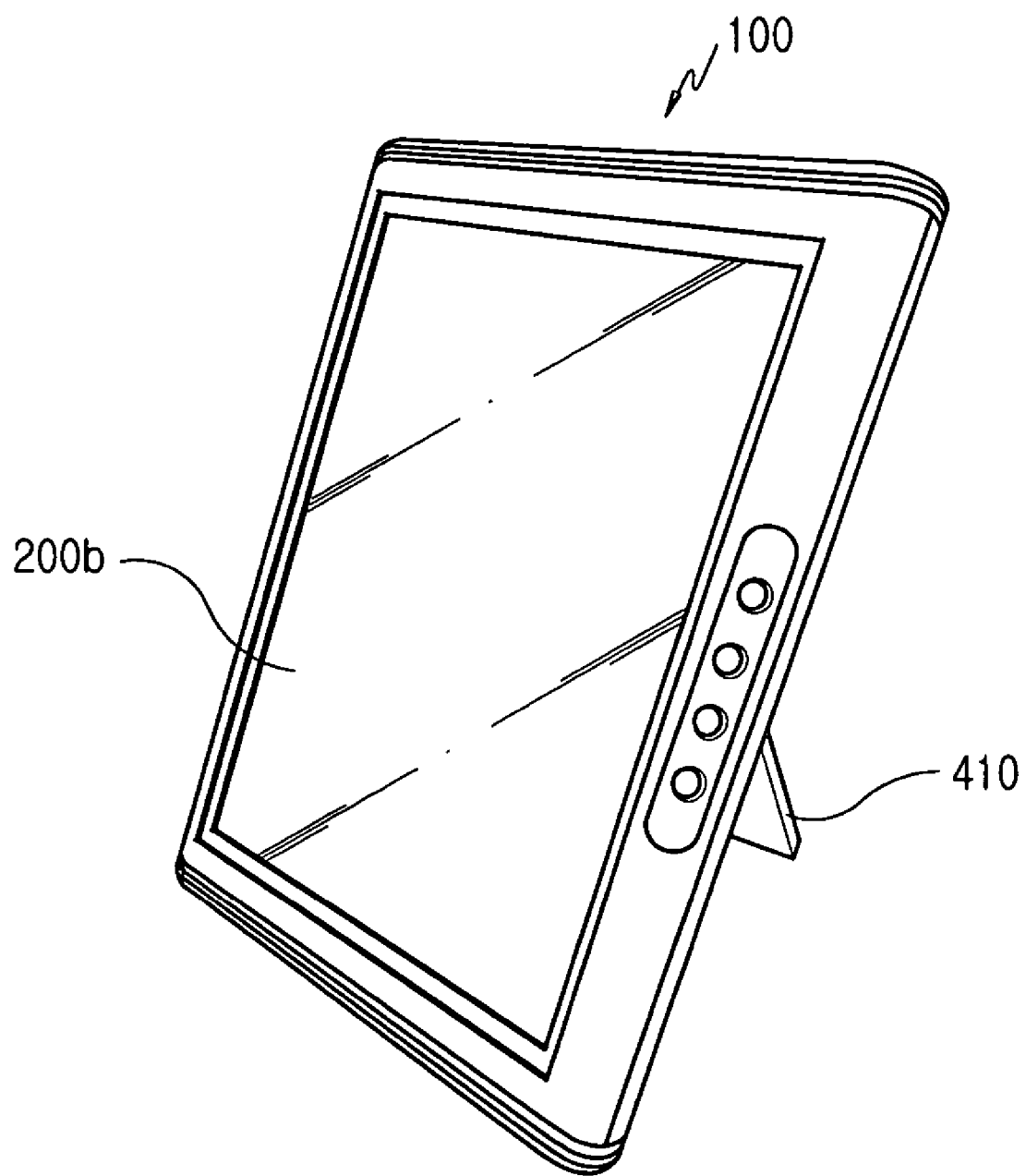

As mentioned above, since the spherical portion 116 can be caused to be slid along the receiving groove 103 and can be rotated vertically and horizontally, the portable communication terminal according to the present invention can be selectively positioned at a slant in the transverse or longitudinal direction. FIG. 11 shows the portable communication terminal slanted in the transverse direction and FIG. 12 shows the portable communication terminal slanted in the longitudinal direction. It will be recognized that the degree of slant of the portable communication terminal can be adjusted by rotating the spherical portion 116, or sliding the spherical portion 116 along the receiving groove 103.

A portable communication terminal according to a second preferred embodiment of the present invention will now be described with reference to FIGS. 13 to 16. The portable communication terminal shown in FIGS. 13 to 16 has the same construction as that of the first embodiment, except for the positioning means 400. For conciseness, descriptions of similar components will not be repeated. For example the cover 100 and the display device 200 of the portable communication terminal of the second embodiment have the same construction as that of the second embodiment, and the opening/closing procedure of the portable communication terminal of the second embodiment is also the same as that of the first embodiment.

The portable communication terminal according to the second embodiment of the present invention has a positioning means 400 placed on the bottom surface 101 of its cover. The positioning means 400 includes a receiving groove 430 formed at a predetermined location on the bottom surface 101 of the cover in a predetermined shape, a support plate 410 adapted to be rotate from a state facing the receiving groove 430 to a position at a slant, by rotating a distal end 412 thereof away from the receiving groove 430, and an auxiliary plate 420 for aiding the support plate 410 by rotating an end 421 thereof along a predetermined path away from a state wherein it is received in the receiving groove 430.

The support plate 410 has a proximal end 411 adapted to act as a center of rotation and perform a sliding movement at the same time. The proximal end 411 is continuously received in the receiving groove 430. The distal end 412 of the support plate is received in the receiving groove 430, is released from it when the support plate 410 is moved, and then contacts the ground. The auxiliary plate 420 has an other end 422 rotatably connected to the receiving groove 430 at a predetermined location and the end 421 rotatably connects to the support plate 410. Consequently, the ends 422 and 421 of the auxiliary plate are provided with rotation axes according to the siding/rotational movement of the support plate 410.

Using the positioning means 400, the portable communication terminal can be positioned at a slant in the transverse or longitudinal direction. Of course, the portable communication terminal is preferably positioned at a slant in the longitudinal direction when using the positioning means 400.

As mentioned above, the present invention provides an information display terminal which can be used as, e.g. a personal digital album, which can be folded or positioned in a convenient manner, and which can be selectively positioned at a slant in the transverse or longitudinal direction so that a user can watch the displayed screen in a convenient manner.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A portable communication terminal for displaying information, comprising:
   a cover having a planar surface;
   a display device adapted to open/close through a sliding linear movement in a direction away from the cover and a rotational movement toward the cover;
   a plurality of openings formed on the cover to facilitate the sliding and rotational movements of the display device from a closed position to a plurality of opened positions, the portable communication terminal exposing the information displayed on the display device in a first slant opened position by forming both the cover and the display device in an inverted-V shape; and
   at least one support arm placed on a lateral surface of the cover for supporting the sliding and rotational movements of the display device,
   wherein the display device, after the sliding linear movement while facing the cover, is rotationally moved from the cover.

2. The portable communication terminal for displaying information as claimed in claim 1, wherein the cover is provided with a positioning means for selectively supporting said terminal at a slant in a transverse or longitudinal direction.

3. The portable communication terminal for displaying information as claimed in claim 2, wherein the positioning means includes a receiving groove formed on a bottom surface of the cover and a positioning rod having an end insertable into the receiving groove to perform a sliding movement along the receiving groove, the positioning rod being adapted to be rotated vertically and horizontally while the end is inserted into the receiving groove.

4. The portable communication terminal for displaying information as claimed in claim 3, wherein the end of the positioning rod has a spherical portion and an outer peripheral groove adjacent to the spherical portion, and has an other end thereof provided with an elastic body.

5. The portable communication terminal for displaying information as claimed in claim 2, wherein the positioning means includes a receiving groove formed on a bottom surface of the cover; a support plate adapted to perform a sliding movement while a proximal end thereof is continuously placed in the receiving groove and to support the display device at a slant by rotating a distal end thereof away from the receiving groove concurrently with the sliding movement; and an auxiliary plate having an end rotatably provided in the receiving groove and an other end rotatably connected to the support plate at a predetermined location for maintaining spacing between the cover and the support plate.

6. The portable communication terminal for displaying information as claimed in claim 1, further comprising a pair of support arms integrally formed on the cover.

7. The portable communication terminal for displaying information as claimed in claim 1, wherein the plurality of openings include a first opening provided on the cover for exposing the displayed information after the sliding and rotational movements of the display device; a second opening formed on an end of the cover; and a third opening formed on an other end of the cover.

8. The portable communication terminal for displaying information as claimed in claim 1, wherein the cover and the at least one support arm are made of a metallic material.

9. The portable communication terminal for displaying information as claimed in claim 1, wherein both ends of the display device are of semi-cylindrical shape and both ends of the at least one support arm are of semi-circular shape for smooth rotational movement of the display device.

10. The portable communication terminal for displaying information as claimed in claim 1, wherein the display device is adapted to perform a 180° rotational movement after a complete sliding movement away from the cover along the linear direction of the support arm and to be safely received in the cover after a complete rotational movement.

11. A portable communication terminal for displaying information, comprising:

a cover;

a display device adapted to perform a sliding movement in a linear direction away from the cover, to perform, after the sliding liner movement, when within a predetermined rotation angle, to move again toward the cover when out of the predetermined rotation angle, and then to continuously face the cover; and a plurality of openings formed on the cover for facilitating the sliding and rotational movements of the display device from a closed position to a plurality of opened positions, the portable communication terminal exposing the information displayed on the display device in a first slant opened position by forming both the cover and the display device in an inverted-V shape, wherein the display device, after the sliding movement while facing the cover, is rotationally moved from the cover.

* * * * *